[12] United States Patent
Windisch et al.

(10) Patent No.: US 6,399,726 B1
(45) Date of Patent: Jun. 4, 2002

(54) METHOD FOR THE COPOLYMERIZATION OF CONJUGATED DIOLEFINS (DIENES) AND VINYL-AROMATIC MONOMERS WITH RARE-EARTH CATALYSTS AND USE OF THE COPOLYMERS IN RUBBER MIXTURES FOR TIRE APPLICATIONS

(75) Inventors: Heike Windisch, Leverkusen; Jürgen Trimbach, Köln; Peter Schertl, Leverkusen; Ellen Giebeler, Köln; Rüdiger Engehausen, Dormagen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/638,627

(22) Filed: Aug. 15, 2000

(30) Foreign Application Priority Data

Aug. 23, 1999 (DE) .......................... 199 39 842

(51) Int. Cl.[7] .......................... C08F 4/72; C08F 236/10
(52) U.S. Cl. ....................... 526/164; 526/128; 526/136; 526/142; 526/161; 526/340; 526/903
(58) Field of Search ................................. 526/128, 164, 526/340, 903, 136, 142, 161

(56) References Cited

U.S. PATENT DOCUMENTS

| 4,540,744 A | 9/1985 | Oshima et al. | 525/332.9 |
| 5,096,970 A | 3/1992 | Hattori et al. | 525/268 |
| 5,096,978 A | 3/1992 | Coran | 525/346 |

FOREIGN PATENT DOCUMENTS

| WO | 00/04066 | 1/2000 |

OTHER PUBLICATIONS

Kobayashi, et al, "Homo– and Copolymerization of Butadiene and Styrene with a Gadolinium Tricarboxylate Catalyst," J. Poly. Sci., Pt. A, Poly. Chem., 33, 2175–2182, 1995.*

Kobayashi, et al, "Homo– and Copolymerization of Butadiene and Styrene with Neodymium Tricarboxylate Catalysts," J. Poly. Sci., Pt. A, 36, 241–247, 1998.*

Hackh's Chemical Dictionary, 4th ed., McGraw–Hill, N. Y., 27, 1969.*

* cited by examiner

Primary Examiner—Fred Teskin
(74) Attorney, Agent, or Firm—Joseph C. Gil; Noland J. Cheung; Jennifer R. Seng

(57) ABSTRACT

The present invention concerns a method for the copolymerization of conjugated diolefins and vinyl-aromatic monomers in the presence of rare-earth catalysts and the use of the copolymers in rubber mixtures for tire applications.

21 Claims, No Drawings

METHOD FOR THE COPOLYMERIZATION OF CONJUGATED DIOLEFINS (DIENES) AND VINYL-AROMATIC MONOMERS WITH RARE-EARTH CATALYSTS AND USE OF THE COPOLYMERS IN RUBBER MIXTURES FOR TIRE APPLICATIONS

FIELD OF THE INVENTION

The present invention concerns a method for the copolymerization of conjugated diolefins and vinyl-aromatic monomers in the presence of rare-earth catalysts and the use of the copolymers in rubber mixtures for tire applications.

BACKGROUND OF THE INVENTION

The polymerization of conjugated diolefins has been known for some time and has been described for example by W. Hoffmann, Rubber Technology Handbook, Hanser Publishers (Carl Hanser Verlag) Munich, Vienna, New York, p. 52 ff., 1989. Thus, polybutadiene, for example, is now predominantly manufactured by solution polymerization with the aid of Ziegler-Natta coordination catalysts, based on titanium, cobalt, nickel and neodymium compounds, for example, or in the presence of alkyl lithium compounds. The solvent used in each case is very much determined by the type of catalyst used. Benzene or toluene and aliphatic or cycloaliphatic hydrocarbons are preferably used.

U.S. Pat. No. 5,096,970 and EP-30 40 88 describe a method for the manufacture of polybutadiene in styrene using catalysts based on neodymium phosphonates, organic aluminum compounds such as di(isobutyl)aluminum hydride (DIBAH) and a halogen-containing Lewis acid, such as ethyl aluminum sesquichloride, whereby butadiene in styrene is reacted to a cis-1,4-polybutadiene with no further addition of inert solvents. A disadvantage of this catalyst is that styrene-butadiene copolymers cannot be formed in this case.

The use of anionic initiators for the polymerization of butadiene and styrene in hexane is known from U.S. Pat. No. 4,540,744. A disadvantage of the method described is that under conditions relevant to applicational practice control of the cis/trans ratio in the butadiene component is possible to only a limited extent, as is the achievement of elevated cis contents. High cis contents are advantageous for applications in the area of tire and synthetic resin modification, however.

A disadvantage in the use of anionic initiators lies in the fact that these initiators allow little control over the microstructure. For example, under conditions relevant to applicational practice, anionic initiators cannot be used to produce a high cis-containing SBR with a cis-1,4 content of over 50%. The addition of modifiers serves only to increase the content of 1,2 units, whereby the 1,2 content leads to a rise in the glass transition temperature of the polymer. This fact is particularly disadvantageous because this method produces SBR in which the rising styrene content in comparison with homopolymeric polybutadiene (BR) causes a further rise in the glass transition temperature. Where SBR rubber is used for impact modification of HIPS or ABS, for example, a high glass transition temperature of the rubber has a negative influence on the low-temperature impact strength of the material, however, as a consequence of which rubbers with low glass transition temperatures are preferred.

In J. Polym. Sci., Part A, Polym. Chem., 33 (1995) 2175 and 36 (1998) 241, for example, Kobayashi, et al. describes a catalyst system consisting of halogenated rare-earth acetates such as $Nd(OCOCCl_3)_3$ or $Gd(OCOCF_3)_3$, with tri(isobutyl) aluminum and diethyl aluminum chloride, which permit the copolymerization of butadiene and styrene in the inert solvent hexane. The disadvantage of these catalysts is that even with a low styrene component of around 5 mol % the catalyst activity falls below 10 g polymer/mmol catalyst/h and that the 1,4-cis content of the polymer falls significantly as the styrene content rises. As a further disadvantage of this method, the microstructure of the polybutadiene segments in the SBR obtained cannot be controlled by the addition of suitable modifiers.

A method for the polymerization of conjugated diolefins with vinyl-aromatic compounds is known from patent application PCT/EP 99/04741 wherein the polymerization is performed in the presence of catalysts based on rare-earth compounds, organoaluminum compounds and optionally cyclopentadienes, whereby the aromatic vinyl compounds used serve as solvent.

The copolymers produced according to this method are used especially for the manufacture of ABS resins. The ABS resin can be manufactured in this instance by performing the copolymerization as a first step and polymerizing the styrene remaining in the reaction mixture in a second polymerization stage, using styrene as solvent. This second reaction step can be performed in the presence of conventional aliphatic or aromatic solvents.

The disadvantage of the polymerization of conjugated dienes and vinyl-aromatic monomers without inert solvents as performed by the method described in the cited patent application is that, for example, technical recovery of the copolymer obtained is difficult as the vinyl-aromatic monomers used as solvents are copolymerized to only a very small degree, which can lead to an undesirable post-polymerization of the reactive monomers during separation, e.g. by stripping.

SUMMARY OF THE INVENTION

Therefore, the object of the present invention was to provide a method for the copolymerization of conjugated diolefins and vinyl-aromatic monomers whereby copolymers are obtained in which the polymer composition in terms of the content of vinyl aromatics and diolefins and in terms of the selectivity of the polymerized diolefins, i.e. the content of double bonds in the cis position and of 1,2 units with lateral vinyl groups, for example, can be varied, whereby the glass transition temperature of the polymer is below −20° C., preferably below −55° C., measured by DSC. Moreover, the copolymers obtained should be easily recoverable from the reaction mixture.

The catalyst systems according to the present invention offer the possibility of adjusting the cis content and hence the ratio of the cis to the trans component independently of the styrene content. This possibility for variation does not exist with the known lithium alkyl-based catalyst systems used in the art under conditions relevant to applicational practice, as here the cis/trans ratios are fixed.

It is known that the compounds for tire mixtures, especially for the tread, are composed of several rubbers in order to obtain the best possible properties, such as rolling resistance, abrasion and wet skid resistance. These rubbers are generally natural rubber and synthetic rubbers such as polybutadiene, butadiene-styrene rubber or polyisoprene. One problem arising from the use of rubber mixtures lies in the fact that incompatibilities can occur between the individual rubber grades. Such incompatibilities may be evidenced by increased tire abrasion, lower tear propagation resistance and a shorter working life for the tire.

It is also known that the relation between rolling resistance and wet skid resistance can be influenced by the styrene content of the butadiene-styrene rubber, a rubber with a high styrene content offering advantages in terms of wet skid resistance, for example.

With the catalyst system according to the present invention, it is now possible to adjust styrene contents selectively in order to obtain an optimum of safety and wet skid resistance and also to ensure compatibility within the rubber mixture, manifested by low abrasion and a long working life, by setting a suitable cis/trans ratio.

The object of the present invention is further to provide copolymers of conjugated diolefins and aromatic vinyl compounds which by virtue of their high content of double bonds in the cis position and the possibilities for varying the content of lateral vinyl groups are extremely suitable for use in tire construction.

DETAILED DESCRIPTION OF THE INVENTION

Therefore, the present invention provides a method for the copolymerization of conjugated diolefins with vinyl-aromatic compounds, characterized in that the polymerization of the conjugated diolefins with the vinyl-aromatic compounds is performed in the presence of catalysts comprising:
a) at least one rare-earth metal compound,
b) at least one cyclopentadienyl compound and
c) at least one organo-aluminum compound
or comprising
a) at least one rare-earth metal compound and
c) at least one organo-aluminum compound
at temperatures of −30 to +100° C. in inert, aromatic, aliphatic or cycloaliphatic solvents or mixtures thereof, whereby the molar ratio of components (a):(b):(c) is in the range of 1:(0.01 to 1.99):(0.1 to 1000) or whereby the molar ratio of components (a):(c) is in the range of 1:(0.1 to 1000), component (a) of the catalyst is used in quantities of 1 µmol to 10 mmol relative to 100 g of the conjugated diolefins used, and the aromatic vinyl compound is used in quantities of 20 g to 2000 g, relative to 100 g of the conjugated diolefins used.

Styrene, α-methyl styrene, α-methyl styrene dimer, p-methyl styrene, divinyl benzene and/or other alkyl styrenes with 2 to 6 C atoms in the alkyl radical, such as ethyl styrenes, can be used as aromatic vinyl compounds according to the present invention. Styrene, α-methyl styrene, α-methyl styrene dimer and/or p-methyl styrene are most particularly preferably used in the polymerization according to the present invention. 1,3-butadiene, 1,3-isoprene, 2,3-dimethyl butadiene, 2,4-hexadiene, 1,3-pentadiene and/or 2-methyl-1,3-pentadiene can, for example, be used as conjugated diolefins (dienes) in the method according to the present invention.

Naturally, in the method according to the present invention, it is also possible to use other unsaturated compounds in addition to the conjugated diolefins, such as ethylene, propene, 1-butene, 1-pentene, 1-hexene and/or 1-octene, preferably ethylene and/or propene, which can be copolymerized with the cited diolefins.

The quantity of unsaturated compounds that can be copolymerized with the conjugated diolefins is governed by the intended use of the required copolymer and can easily be determined by means of appropriate preliminary tests. It is usually 0.1 to 80 mol %, preferably 0.1 to 60 mol %, most preferably 0.1 to 45 mol %, relative to the diolefin.

The molar ratio of components (a):(b):(c) in the catalyst used is preferably in the range of 1:(0.1 to 1.9):(3 to 500), most preferably 1:(0.2 to 1.8):(5 to 100). molar ratio of components (a):(c) is preferably in the range of 1:(3 to 500), most preferably 1:(5 to 100).

Suitable rare-earth metal compounds (component (a)) are, in particular, those selected from an alcoholate of the rare-earth metals, a phosphonate, phosphinate and/or phosphate of the rare-earth metals, a carboxylate of the rare-earth metals, a co-ordination compound of the rare-earth metals with diketones and/or an addition compound of the halides of the rare-earth metals with an oxygen or nitrogen donor compound.

The above rare-earth metal compounds are described in greater detail in EP-01 11 84, for example.

The rare-earth metal compounds are based, in particular, on elements with the atomic numbers 21, 39 and 57 to 71. Lanthanum, praseodymium or neodymium or a mixture of rare-earth metal elements containing at least 10 wt. % of one of the elements lanthanum, praseodymium or neodymium, are preferably used as rare-earth metals. Lanthanum or neodymium, which again can be mixed with other rare-earth metals, are most preferably used as rare-earth metals. The proportion of lanthanum and/or neodymium in such a mixture is most preferably at least 30 wt. %.

Suitable alcoholates, phosphonates, phosphinates and carboxylates of the rare-earth metals or coordination compounds of the rare-earth metals with diketones are, in particular, those in which the organic group contained in the compounds contains in particular straight-chained or branched alkyl radicals with 1 to 20 carbon atoms, preferably 1 to 15 carbon atoms, such as methyl, ethyl, n-propyl, n-butyl, n-pentyl, isopropyl, isobutyl, tert-butyl, 2-ethylhexyl, neo-pentyl, neo-octyl, neo-decyl or neo-dodecyl.

Examples of rare-earth alcoholates include: neodymium (III)-n-propanolate, neo-dymium(III)-n-butanolate, neodymium(III)-n-decanolate, neodymium(III)-iso-propanolate, neodymium(III)-2-ethyl hexanolate, praseodymium(III)-n-propanolate, praseodymium(III)-n-butanolate, praseodymium(III)-n-decanolate, praseodymium(III)-isopropanolate, praseodymium(III)-2-ethyl hexanolate, lanthanum(III)-n-propanolate, lanthanum (III)-n-butanolate, lanthanum(III)-n-decanolate, lanthanum (III)-isopropanolate and lanthanum(III)-2-ethyl hexanolate, preferably neodymium(III)-n-butanolate, neodymium(III)-n-decanolate and neodymium(III)-2-ethyl hexanolate.

Examples of rare-earth phosphonates, phosphinates and phosphates include: neodymium(lll) dibutyl phosphonate, neodymium(III) dipentyl phosphonate, neodymium(III) dihexyl phosphonate, neodymium(III) diheptyl phosphonate, neodymium(III) dioctyl phosphonate, neodymium(III) dinonyl phosphonate, neodymium(III) didodecyl phosphonate, neodymium(III) dibutyl phosphinate, neodymium(III) dipentyl phosphinate, neodymium(III) dihexyl phosphinate, neodymium(III) diheptyl phosphinate, neodymium(III) dioctyl phosphinate, neodymium(III) dinonyl phosphinate, neodymium(III) didodecyl phosphinate and neodymium(III) phosphate, preferably neodymium(III) dioctyl phosphonate and neodymium (III) dioctyl phosphinate.

Suitable rare-earth metal carboxylates are: lanthanum(III) propionate, lanthanum(III) diethyl acetate, lanthanum(III) 2-ethyl hexanoate, lanthanum(III) stearate, lanthanum(III) benzoate, lanthanum(III) cyclohexane carboxylate, lanthanum(III) oleate, lanthanum(III) versatate, lanthanum (III) naphthenate, praseodymium(III) propionate, praseodymium(III) diethyl acetate, praseodymium(III) 2-ethyl hexanoate, praseodymium(III) stearate, praseodymium(III) benzoate, praseodymium(III) cyclohexane carboxylate, praseodymium(III) oleate, praseodymium (III) versatate, praseodymium(III) naphthenate, neodymium (III) propionate, neodymium(III) diethyl acetate, neodymium(III) 2-ethyl hexanoate, neodymium(III) stearate, neodymium(III) benzoate, neodymium(III) cyclohexane carboxylate, neodymium(III) oleate, neodymium (III) versatate and neodymium(III) naphthenate, preferably neodymium(III) 2-ethyl hexanoate, neodymium(III) versatate and neodymium(III) naphthenate. Neodymium versatate is particularly preferred.

Examples of rare-earth coordination compounds with diketones include: lanthanum(III) acetyl acetonate, praseodymium(III) acetyl acetonate and neodymium(III) acetyl acetonate, preferably neodymium(III) acetyl acetonate.

Examples of addition compounds of rare-earth metal halides with an oxygen or nitrogen donor compound include: lanthanum(III) chloride with tributyl phosphate, lanthanum(III) chloride with tetrahydrofuran, lanthanum (III) chloride with isopropanol, lanthanum(III) chloride with pyridine, lanthanum(III) chloride with 2-ethyl hexanol, lanthanum(III) chloride with ethanol, praseodymium(III) chloride with tributyl phosphate, praseodymium(III) chloride with tetrahydrofuran, praseodymium(III) chloride with isopropanol, praseodymium(III) chloride with pyridine, praseodymium-(III) chloride with 2-ethyl hexanol, praseodymium(III) chloride with ethanol, neodymium(III) chloride with tributyl phosphate, neodymium(III) chloride with tetrahydrofuran, neodymium(III) chloride with isopropanol, neodymium(III) chloride with pyridine, neodymium(III) chloride with 2-ethyl hexanol, neodymium (III) chloride with ethanol, lanthanum(III) bromide with tributyl phosphate, lanthanum(III) bromide with tetrahydrofuran, lanthanum(III) bromide with isopropanol, lanthanum(III) bromide with pyridine, lanthanum(III) bromide with 2-ethyl hexanol, lanthanum(III) bromide with ethanol, praseodymium(III) bromide with tributyl phosphate, praseodymium(III) bromide with tetrahydrofuran, praseodymium(III) bromide with isopropanol, praseodymium(III) bromide with pyridine, praseodymium(III) bromide with 2-ethyl hexanol, praseodymium(III) bromide with ethanol, neodymium(III) bromide with tributyl phosphate, neodymium(III) bromide with tetrahydrofuran, neodymium(III) bromide with isopropanol, neodymium(III) bromide with pyridine, neodymium(III) bromide with 2-ethyl hexanol and neodymium(III) bromide with ethanol, preferably lanthanum(III) chloride with tributyl phosphate, lanthanum (III) chloride with pyridine, lanthanum(III) chloride with 2-ethyl hexanol, praseodymium(III) chloride with tributyl phosphate, praseodymium(III) chloride with 2-ethyl hexanol, neodymium(III) chloride with tributyl phosphate, neodymium(III) chloride with tetrahydrofuran, neodymium (III) chloride with 2-ethyl hexanol, neodymium(III) chloride with pyridine, neodymium(III) chloride with 2-ethyl hexanol and neodymium(III) chloride with ethanol.

Neodymium versatate, neodymium octanoate and/or neodymium naphthenate are most particularly preferably used as rare-earth metal compounds.

The above rare-earth metal compounds can be used both alone or combined in a mixture. The most favorable mixing ratio can easily be determined by means of appropriate preliminary tests.

Compounds with formulae (I), (II) or (III)

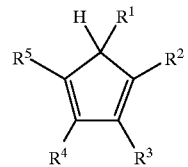

(I)

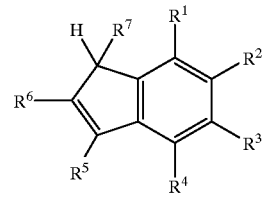

(II)

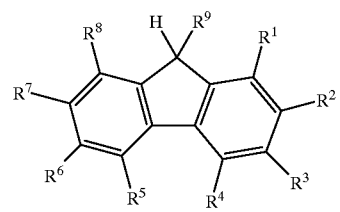

(III)

are used as cyclopentadienes (component (b)), wherein $R^1$ to $R^9$ are the same or different or are optionally bonded together or are condensed to cyclopentadiene with formula (I), (II) or (III), and represent hydrogen, a $C_1$ to $C_{30}$ alkyl group, a $C_6$ to $C_{10}$ aryl group, a $C_7$ to $C_{40}$ alkylaryl group or a $C_3$ to $C_{30}$ silyl group, whereby the alkyl groups may be either saturated or mono- or polyunsaturated and may contain heteroatoms such as oxygen, nitrogen or halides. The radicals may, in particular, stand for hydrogen, methyl, ethyl, n-propyl, isopropyl, n-butyl, isobutyl, tert-butyl, phenyl, methylphenyl, cyclohexyl, benzyl, trimethylsilyl or trifluoromethyl.

Examples for the cyclopentadienes include unsubstituted cyclopeniadiene, methyl cyclopentadiene, ethyl cyclopentadiene, n-butyl cyclopentadiene, tert-butyl cyclopentadiene, vinyl cyclopentadiene, benzyl cyclopentadiene, phenyl cyclopentadiene, trimethylsilyl cyclopentadiene, 2-methoxyethyl cyclopentadiene, 1,2-dimethyl cyclopentadiene, 1,3-dimethyl cyclopentadiene, trimethyl cyclopentadiene, tetramethyl cyclopentadiene, tetraphenyl cyclopentadiene, tetrabenzyl cyclopentadiene, pentamethyl cyclopentadiene, pentabenzyl cyclopentadiene, ethyl tetramethyl cyclopentadiene, trifluoromethyl tetramethyl cyclopentadiene, indene, 2-methyl indenyl, trimethyl indene, hexamethyl indene, heptamethyl indene, 2-methyl-4-phenyl indenyl, fluorene or methyl fluorene.

The cyclopentadienes can likewise be used either alone or combined in a mixture.

Suitable organo-aluminum compounds (component (c)) include, in particular, alumoxanes and/or aluminum organyl compounds.

Examples of alumoxanes include such aluminum oxygen compounds which, as is known to the person skilled in the art, are obtained by contact between organo-alu-minum compounds and condensing components, such as water, and which are non-cyclic or cyclic compounds with formula $(-Al(R)O-)_n$, whereby R may be the same or different and stands for a linear or branched alkyl group with 1 to 10 carbon atoms, which may further contain heteroatoms such as oxygen or nitrogen. R particularly stands for methyl, ethyl, n-propyl, isopropyl, n-butyl, isobutyl, tert-butyl, n-octyl or isooctyl, particularly preferably methyl, ethyl or isobutyl. Examples for alumoxanes include: methyl alumoxane, ethyl alumoxane and isobutyl alumoxane, preferably methyl alumoxane and isobutyl alumoxane.

Examples of aluminum organyl compounds to be cited include in particular compounds with the formula $AlR_{3-d}X_d$, whereby R can be the same or different and represent a $C_1$–$C_{10}$ aryl group or a $C_7$ to $C_{40}$ alkylaryl group, whereby the alkyl groups may be either saturated or monounsaturated and may contain heteroatoms, such as oxygen or nitrogen, X represents a hydrogen, alcoholate, phenolate or amide and d represents a number from 0 to 2.

The following are particularly suitable for use as organo-aluminum compounds with formula $AlR_{3-d}X_d$: trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, diethyl aluminum hydride, di-n-butyl aluminum hydride, diisobutyl aluminum hydride, diethyl aluminum butanolate, diethyl aluminum methylidene (dimethyl)amine and diethyl aluminum methylidene (methyl)-ether, preferably trimethyl aluminum, triethyl aluminum, triisobutyl aluminum and diisobutyl aluminum hydride.

The organo-aluminum compounds can again be used either alone or combined in a mixture.

It is also possible to add a further component (d) to the catalyst components (a) to (c). This component (d) may be a conjugated diene, for example, the same diene that is later to be polymerized with the catalyst, butadiene and/or isoprene being preferably used, or for example, the same vinyl-aromatic monomer that is later to be polymerized with the catalyst, styrene or substituted styrene derivatives being preferred, or mixtures of diene and vinyl-aromatic monomer.

If component (d) is added to the catalyst, the quantity of (d) is preferably 1 to 1000 mol, relative to 1 mol of component (a), more preferably 1 to 100 mol. 1 to 50 mol of (d), relative to 1 mol of component (a), are most preferably used.

In the method according to the present invention, the catalysts are used in quantities of preferably 10 µmol to 5 mmol of component (a), preferably 20 µm to 1 mmol of component (a), relative to 100 g of monomers. Naturally, the catalysts can also be used in any combination whatsoever.

The quantity of aromatic vinyl compounds used is preferably 30 to 1000 g, most preferably 50 to 500 g, relative to 100 g of the diolefins used.

Inert, aromatic, aliphatic or cycloaliphatic solvents, which may optionally be substituted with halogens or $C_1$–$C_4$ alkyl radicals, for example, are used as solvents in the method according to the present invention. Examples of suitable solvents include: benzene, toluene, pentanes, hexanes, heptanes, cyclohexane, ethylbenzene, dimethylbenzene, dichloromethane and chlorobenzene. Both straight-chain alkanes and branched isomers thereof are suitable for use as aliphatic solvents.

The solvents can be used either alone or combined in a mixture; the most favorable mixing ratio can be easily determined by means of appropriate preliminary tests.

The quantity of solvent in the method according to the present invention is conventionally 1000 to 100 g, preferably 500 to 150 g, relative to 100 g of monomer.

The method according to the present invention is preferably performed at temperatures of −20 to 140° C., more preferably at temperatures of 20 to 120° C.

The method according to the present invention can be performed without the use of pressure or at elevated pressure (0.1 to 12 bar).

The method according to the present invention can be conducted continuously or batchwise, preferably as a continuous operation.

The polymer composition can be influenced by varying the reaction conditions, for example, by varying the ratio of diolefins and aromatic vinyl compounds used, the catalyst concentration, the reaction temperature and reaction time.

The present invention further provides the use of the copolymers of conjugated diolefins and vinyl-aromatic compounds produced according to the present invention in rubber moldings in which copolymers of conjugated diolefins and vinyl-aromatic compounds with a high cis-1,4 content are required. The copolymers produced according to the present invention are particularly suitable for the manufacture of tires, preferably tire treads.

By means of the method according to the present invention, it is possible to obtain copolymers of diolefins and vinyl aromatics, which unlike the anionic initiators, have a high content of cis-1,4 double bonds relative to the diolefin component and which with high catalyst activity and high conversion of diolefins used, further allow the microstructure, i.e. the content of lateral vinyl units and cis-1,4 units, of the polymer composition and the molecular weight to be easily controlled. The use of inert, organic solvents in the method according to the present invention means that recovery of the copolymers obtained is technically advantageous.

EXAMPLES

Catalyst preparation and polymerization were performed with full exclusion of air and moisture under a nitrogen atmosphere.

The content of styrene in the polymer and the selectivity of the polybutadiene (cis-1,4, trans-1,4 and vinyl-1,2 content) are determined by means of IR spectroscopy and the glass transition temperature $T_g$ by DSC.

Examples 1 to 4

Catalyst Preparation 17.8 ml (4 mmol) of neodymium(III) versatate (NDV) solution (0.225 mol/l in hexane) were placed in a 200 ml Schlenk vessel and 0.5 ml (4 mmol) 1H-indene and 12 ml (120 mmol) isoprene were added at 25° C. 78 ml (120 mmol) MAO* solution (10 wt. % in toluene) were then added and stirred for 2 hours at 50° C. After cooling to room temperature, the catalyst solution was used for the polymerization trials with no further treatment.

* MAO=methyl alumoxane

Polymerization

Polymerization was performed in a 2-litre Buichi glass autoclave. The quantities of styrene, 1,3-butadiene, hexane (isomer mixture), catalyst solution and aluminum compound stated in Table 1 were added via burettes under nitrogen. The temperature was set as shown in Table 1. After the stated reaction time, the polymer was isolated by precipitating the polymer solution in ethanol/BHT (2,6-di-tert-butyl-4-methyl phenol) and dried to constant weight in a vacuum drying oven at 60° C. The batch sizes, reaction conditions and properties of the polymers obtained are shown in Table 1.

TABLE 1

Examples 1 to 4

| Example | 1 | 2 | 3 | 4 |
|---|---|---|---|---|
| Catalyst solution in ml | 6.1 | 6.1 | 6.1 | 6.1 |
| NDV in mmol | 0.225 | 0.225 | 0.225 | 0.225 |
| Polymerization | | | | |
| Hexane in ml | 900 | 900 | 900 | 900 |
| Styrene in ml | 82 | 82 | 40 | 100 |
| 1,3-butadiene in g | 74.4 | 74.4 | 112 | 59 |
| DIBAH in mmol | 3.375 | 3.375 | 3.375 | 3.375 |
| Temperature in °C. | 60 | 80 | 80 | 80 |
| Reaction time in h | 4 | 4 | 3 | 4 |
| Polymer | | | | |
| Yield in % | 44 | 58 | 85 | 35 |
| Styrene content in wt. % | 14.4 | 15.8 | 7.5 | 23.5 |
| Butadiene content in wt. % | 85.6 | 84.2 | 92.5 | 76.5 |
| cis-1,4 in % | 37.8 | 40.5 | 48.2 | 41.0 |
| trans-1,4 in % | 54.8 | 51.8 | 44.2 | 51.5 |
| 1,2 in % | 7.4 | 7.7 | 7.6 | 7.5 |
| Tg in °C. | −84.6 | nd | −92.9 | nd |

Examples 5 to 6

Catalyst Preparation 17.8 ml (4 mmol) neodymium(III) versatate solution (0.225 mol/l in hexane) were placed in a 200 ml Schlenk vessel and 0.65 ml (4 mmol) 1,2,3,4,5-pentamethyl cyclopenta-1H-diene and 12 ml (120 mmol) isoprene were added at 25° C. 78 ml (120 mmol) of MAO solution (10 wt. % in toluene) were then added and stirred at 50° C. for 2 hours. After cooling to room temperature, the catalyst solution was used for the polymerization trials with no further treatment.

Polymerization

Polymerization was performed as in Examples 1 to 4, whereby the catalyst described above was used. The batch sizes, reaction conditions and the properties of the polymers obtained are shown in Table 2.

TABLE 2

Examples 5 to 6

| Example | 5 | 6 |
|---|---|---|
| Catalyst solution in ml | 6.1 | 6.1 |
| NDV in mmol | 0.225 | 0.225 |
| Polymerization | | |
| Hexane | 900 | 900 |
| Styrene in ml | 40 | 82 |
| 1,3-butadiene in g | 112 | 74 |
| DIBAH in mmol | 3.375 | 3.375 |
| Temperature in °C. | 80 | 80 |
| Reaction time in h | 3 | 3 |
| Polymer | | |
| Yield in % | 88 | 60 |
| Styrene content in wt. % | 7.3 | 18.8 |
| Butadiene content in wt. % | 92.7 | 81.2 |
| cis-1,4 in % | 36.4 | 27.0 |
| trans-1,4 in % | 52.9 | 62.8 |
| 1,2 in % | 10.7 | 10.3 |
| Tg in °C. | nd | nd |

Examples 7 to 9

Catalyst Preparation 17.8 ml (4 mmol) neodymium(III) versatate solution (0.225 mol/l in hexane) were placed in a 200 ml Schlenk vessel and 0.5 ml (4 mmol) 1H-indene and 12 ml (120 mmol) isoprene were added at 25° C. 78 ml (120 mmol) of MAO solution (10 wt. % in toluene) were then added, stirred at 50° C. for 2 hours and used for the polymerization trials after being cooled to room temperature.

Polymerization

Polymerization was performed as in Examples 1 to 4, whereby MAO was used as scavenger in place of DIBAH. The batch sizes, reaction conditions and the properties of the polymers obtained are shown in Table 3.

TABLE 3

Examples 7 to 9

| Example | 7 | 8 | 9 |
|---|---|---|---|
| Catalyst solution in ml | 6.1 | 6.1 | 6.1 |
| NDV in mmol | 0.225 | 0.225 | 0.225 |
| Polymerization | | | |
| Hexane in ml | 900 | 900 | 900 |
| Styrene in ml | 82 | 82 | 82 |
| 1,3-butadiene in g | 74 | 74 | 74 |
| MAO in mmol | 3.375 | — | 6.75 |
| Temperature in °C. | 80 | 80 | 80 |
| Reaction time in h | 4 | 4 | 4 |
| Polymer | | | |
| Yield in % | 53 | 52 | 59 |
| Styrene content in wt. % | 18.6 | 14.7 | 19.1 |
| Butadiene content in wt. % | 81.4 | 85.3 | 80.9 |
| cis-1,4 in % | 50.9 | 45.9 | 51.8 |
| trans-1,4 in % | 41.7 | 46.6 | 40.8 |
| 1,2 in % | 7.4 | 7.4 | 7.4 |
| Tg in °C. | −87.2 | nd | nd |
| $ML_{1+4}$(100° C.) | 38 | 40 | 39 |

Examples 10 to 15

Catalyst Preparation 17.8 ml (4 mmol) neodymium(III) versatate solution (0.225 mol/l in hexane) were placed in a 200 ml Schlenk vessel and 0.5 ml (4 mmol) 1H-indene and 12 ml (120 mmol) isoprene were added at 25° C. 78 ml (120 mmol) of MAO solution (10 wt. % in toluene) were then added, stirred at 50° C. for 2 hours and used for the polymerization trials after being cooled to room temperature.

Polymerization

Polymerization was performed as in Examples 1 to 4, whereby the amount of catalyst and solid was varied and a choice of MAO or DIBAH was used as scavenger. The batch sizes, reaction conditions and the properties of the polymers obtained are shown in Table 4.

TABLE 4

Examples 10 to 15

| Example | 10 | 11 | 12 | 13 | 14 | 15 |
|---|---|---|---|---|---|---|
| Catalyst solution in ml | 4.1 | 4.9 | 5.0 | 6.72 | 3.4 | 2.5 |
| NDV in mmol | 0.150 | 0.180 | 0.186 | 0.248 | 0.124 | 0.093 |
| Polymerization | | | | | | |
| Hexane in ml | 900 | 900 | 800 | 700 | 700 | 800 |
| Styrene in ml | 74 | 74 | 150 | 205 | 205 | 150 |

TABLE 4-continued

Examples 10 to 15

| Example | 10 | 11 | 12 | 13 | 14 | 15 |
|---|---|---|---|---|---|---|
| 1,3-butadiene in g | 81 | 81 | 93 | 124 | 124 | 93 |
| MAO in mmol | 3.375 | 3.375 | — | — | — | — |
| DIBAH in mmol | — | — | 0.930 | 1.240 | 0.620 | 0.465 |
| Temperature in ° C. | 80 | 80 | 80 | 80 | 80 | 80 |
| Reaction time in h | 4 | 4 | 4 | 4 | 6 | 4 |
| Polymer | | | | | | |
| Yield in % | 58 | 61 | 43 | 47 | 47 | 30 |
| Styrene content in wt. % | 14.4 | 15.8 | 18.4 | 23.3 | 23.7 | 13.3 |
| Butadiene content in wt. % | 95.6 | 84.2 | 81.6 | 76.7 | 76.3 | 86.7 |
| cis-1,4 in % | 57.9 | 54.3 | 51.2 | 47.8 | 60.2 | 67.9 |
| trans-1,4 in % | 34.5 | 38.2 | 41.3 | 44.6 | 32.2 | 24.2 |
| 1,2 in % | 7.6 | 7.5 | 7.6 | 7.6 | 7.7 | 7.9 |
| Tg in ° C. | nd | nd | nd | nd | nd | nd |
| $ML_{1+4}$ (100° C.) | 56 | 51 | nd | nd | nd | nd |

Examples 16 to 18

Catalyst Preparation 5 18.1 ml (4 mmol) of neodymium(III) versatate solution (0.22 mol/l in hexane) were placed in a 200 ml Schlenk vessel and 12 ml (120 mmol) isoprene were added at 25° C. 78 ml (120 mmol) MAO solution (10 wt. % in toluene) were then added and stirred for 2 hours at 50° C. After cooling to room temperature the catalyst solution was used for the polymerization trials with no further treatment.

Polymerization

Polymerization was performed in a 2-liter Buichi glass autoclave. The quantities of styrene, butadiene, hexane, catalyst solution and aluminum compound stated in Table 1 were added via burettes under nitrogen. The temperature was set as shown in Table 1. After the stated reaction time, the polymer was isolated by precipitating the polymer solution in ethanol/BHT (2,6-di-tert-butyl-4-methyl phenol) and dried to constant weight in a vacuum drying oven at 60° C. The batch sizes, reaction conditions and properties of the polymers obtained are shown in Table 5.

TABLE 5

Example 16 to 18

| Example | 16 | 17 | 18 |
|---|---|---|---|
| Catalyst solution in ml | 4.9 | 3.4 | 6.1 |
| NDV in mmol | 0.180 | 0.124 | 0.225 |
| Polymerization | | | |
| Hexane in ml | 900 | 700 | 900 |
| Styrene in ml | 74 | 205 | 82 |
| 1,3-butadiene in g | 80.6 | 124 | 74.4 |
| MAO in mmol | 3.375 | — | 3.375 |
| DIBAH in mmol | — | 0.62 | — |
| Temperature in ° C. | 80 | 80 | 80 |
| Reaction time in h | 4 | 4 | 4 |
| Polymer | | | |
| Yield in % | 40 | 28 | 37 |
| Styrene content in wt. % | 4.4 | 6.9 | 5.5 |
| Butadiene content in wt. % | 95.6 | 93.1 | 94.5 |
| cis in % | 61.6 | 62.1 | 58.2 |
| trans in % | 32.1 | 30.9 | 35.3 |
| 1,2 in % | 6.3 | 7.0 | 6.5 |
| $ML_{1+4}$(100° C.) | 21 | 30 | 16 |

Example 19

Manufacture of rubber bodies with the copolymers produced according to the present invention A tire tread formulation conventionally used in the tire industry was chosen to test the copolymer. The styrene content was kept constant at 17.5% relative to the polymer.

Formulation

| Mix no. | 1 | 2 | 3 |
|---|---|---|---|
| Buna VSL 5025-1* | 96.25 | 88.55 | 80.9 |
| Buna CB 25* | 30 | 25.6 | 21.2 |
| SBR, cf. Ex. 11 | 0 | 10 | 20 |
| Styrene in compound | 17.5 | 17.5 | 17.5 |
| Vinyl in compound | 35.0 | 32.9 | 30.7 |
| Cis in compound | 37.1 | 37.1 | 37.0 |
| Trans in compound | 10.4 | 12.6 | 14.7 |
| Enerthene 1849-1 (BP) | 11.25 | 13.35 | 15.4 |
| Carbon black N121 (Degussa Hüls) | 10 | | |
| Vulkasil S (Bayer) | 70 | | |
| Silane Si 69 (Degussa Hüls) | 6 | | |
| Zinc oxide RS (Degrillo) | 3 | | |
| Stearic acid (Henkel) | 1 | | |
| Antilux 654 (Rhein Chemie) | 1 | | |
| Vulkanox HS (Bayer) | 1.5 | | |
| Vulkanox 4020 (Bayer) | 1.5 | | |
| Vulkacit CZ (Bayer) | 1.4 | | |
| Vulkacit D (Bayer) | 2 | | |
| Sulfur (Solvey) | 1.6 | | |

*Commercial products from Bayer

The mixtures (polymer, oil, carbon black, zinc oxide, stearic acid and antioxidants) were produced in two stages in a GK 1.5 compounder at around 150° C. The vulcanization chemicals were incorporated subsequently on a roll at max. 115° C. The heating time for manufacture of the specimens was 15 minutes at 170° C. The specimens were then tested according to the DIN and ASTM methods conventionally used in the tire industry.

Vulcanizate Values

| | | 1 | 2 | 3 |
|---|---|---|---|---|
| Tensile strength (MPa) | DIN 53504 | 18.7 | 17.7 | 18.3 |
| Elongation (%) | DIN 53504 | 465 | 450 | 480 |
| Modulus at 100% elongation (MPa) | DIN 53504 | 2.4 | 2.5 | 2.5 |
| Hardness at 23° C. (Shore A) | DIN 53505 | 66 | 67 | 68 |
| Hardness at 70° C. (Shore A) | DIN 53505 | 65 | 65 | 65 |
| Elasticity at 23° C. (%) | DIN 53512 | 35 | 34 | 35 |
| Elasticity at 70° C. (%) | DIN 53512 | 60 | 62 | 63 |
| Tear propagation strength | DIN 53515 | 37 | 41 | 43 |

-continued

| Mixture no. | | 1 | 2 | 3 |
|---|---|---|---|---|
| (N/mm) | | | | |
| DIN abrasion 40 (mm³) | DIN 53516 | 160 | 148 | 146 |
| DIN abrasion 60 (mm³) | DIN 53516 | 101 | 87 | 82 |
| Goodrich flexometer, temperature rise (Kelvin) | DIN 53533 | 15.8 | 15.2 | 13.9 |
| tan δ at 60° C. | DIN 53513 | 0.112 | 0.103 | 0.097 |

A clear improvement in the dynamic values can be observed with virtually unchanged mechanical properties and slightly improved tear propagation strength. Thus, the energy dissipation capability of the vulcanizates is already significantly improved by the use of only 10 to 20% of the copolymer produced according to the present invention relative to polymer. Heating-up of the vulcanizate under mechanical influence is reduced (Goodrich flexometer test) and tan δ, measured at 60° C., a measure of the roll resistance of the tire, is markedly improved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for the copolymerization of conjugated diolefins with vinyl-aromatic compounds, wherein the polymerization of the conjugated diolefins with the vinyl-aromatic compounds is performed in the presence of catalysts consisting of
   a) at least one rare-earth metal compound and
   b) at least one organo-aluminum compound and in the presence of inert aliphatic and/or aromatic solvents or mixtures thereof at temperatures of −30 to +140° C., whereby the molar ratio of components (a):(b) is in the range of 1:(0.1 to 1000), component (a) of the catalyst is used in quantities of 1 µmol to 10 mmol relative to 100 g of the conjugated diolefins used, and the vinyl aromatic compound is used in quantities of 20 g to 2000 g, relative to 100 g of the conjugated diolefins used.

2. A method according to claim 1, wherein said conjugated diolefins are selected from the group consisting of 1,3-butadiene, 1,3-isoprene, 2,3-dimethyl butadiene, 2,4-hexadiene, 1,3-pentadiene and 2-methyl-,3-pentadiene.

3. A method according to claim 1, wherein said rare-earth metal compounds are selected from the group consisting of rare earth alcoholates, phosphonates, phosphinates, phosphates or carboxylates, the coordination compounds of rare-earth metals with diketones and the addition compounds of rare-earth metal halides with an oxygen or nitrogen donor compound.

4. A method according to claim 3, wherein said rare-earth metal compounds is selected from the group consisting of neodymium versatate, neodymium octanate and neodymium naphthenate.

5. A method according to claim 1, wherein said organo-aluminum compound is selected from the group consisting of alumoxanes and aluminum organyl compounds.

6. A method according to claim 1, wherein said solvent is selected from the group consisting of butanes, pentanes, hexanes, cyclohexane, cyclopentane, cycloheptane, heptanes, benzene, toluene, ethyl benzene, dimethyl benzenes, dichloromethane, chlorobenzene and mixtures thereof.

7. A method according to claim 1, wherein said vinyl-aromatic compound is selected from the group consisting of styrene, α-methyl styrene, α-methyl styrene dimer, p-methyl styrene, divinyl benzene and alkyl styrenes with 2 to 6 C atoms in the alkyl radical and said conjugated diolefins are selected from the group consisting of 1,3-butadiene, 1,3-isoprene, 2,3-dimethyl butadiene, 2,4-hexadiene, 1,3-pentadiene and 2-methyl-1,3-pentadiene.

8. A method according to claim 1, wherein, in addition to the conjugated diolefins, further unsaturated compounds, which can be copolymerized with the specified conjugated diolefins are used in quantities of 0.1 to 80 mol % relative to the conjugated diolefin.

9. A method for the copolymerization of conjugated diolefins with vinyl-aromatic compounds, wherein the polymerization of the conjugated diolefins with the vinyl-aromatic compounds is performed in the presence of catalysts comprising
   a) at least one rare-earth metal compound,
   b) at least one cyclopentadienyl compound and
   c) at least one organo-aluminum compound;

and in the presence of inert aliphatic and/or aromatic solvents or mixtures thereof at temperatures of −30 to +140° C., whereby the molar ratio of components (a):(b):(c) is in the range of 1:(0.01 to 1.99):(0.1 to 1000), component (a) of the catalyst is used in quantities of 1 lmol to 10 µmol relative to 100 g of the conjugated diolefins used, and the vinyl-aromatic compound is used in quantities of 20 g to 2000 g, relative to 100 g of the conjugated diolefins used.

10. A method according to claim 9, wherein said conjugated diolefins are selected from the group consisting of 1,3-butadiene, 1,3-isoprene, 2,3-dimethyl butadiene, 2,4-hexadiene, 1,3-pentadiene and 2-methyl-1,3-pentadiene.

11. A method according to claim 9, wherein said rare-earth metal compounds are selected from the group consisting of rare earth alcoholates, phosphonates, phosphinates, phosphates or carboxylates, the coordination compounds of rare-earth metals with diketones and the addition compounds of rare-earth metal halides with an oxygen or nitrogen donor compound.

12. A method according to claim 11, wherein said rare-earth metal compounds are selected from the group consisting of neodymium versatate, neodymium octanate and neodymium naphthenate.

13. A method according to claim 11, wherein said at least one cyclo pentadienyl compound comprises the formulae (I), (II) or (III)

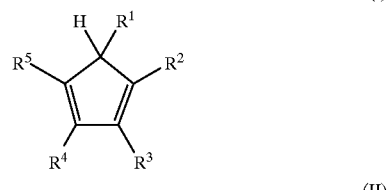

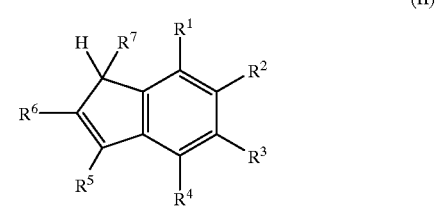

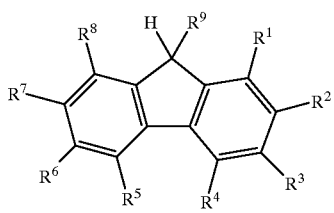

(III)

wherein $R^1$ to $R^9$ are the same or different or are optionally bonded together or are condensed to cyclopentadiene with formula (I), (II) or (III), and represent hydrogen, a $C_1$ to $C_{30}$ saturated or mono- or polyunsaturated or heteroatom-containing group, a $C_6$ to $C_{10}$ aryl group, a $C_7$ to $C_{40}$ alkylaryl group or a $C_3$ to $C_{30}$ silyl group.

14. A method according to claim 9, wherein said organoaluminum compound is selected from the group consisting of alumoxanes and aluminum organyl compounds.

15. A method according to claim 9, wherein said solvent is selected from the group consisting of butanes, pentanes, hexanes, cyclohexane, cyclopentane, cycloheptane, heptanes, benzene, toluene, ethyl benzene, dimethyl benzenes, dichloromethane, chlorobenzene and mixtures thereof.

16. A method according to claim 9, wherein said vinyl-aromatic compound is selected from the group consisting of styrene, α-methyl styrene, α-methyl styrene dimer, p-methyl styrene, divinyl benzene and alkyl styrenes with 2 to 6 C atoms in the alkyl radical and said conjugated diolefins are selected from the group consisting of 1,3-butadiene, 1,3-isoprene, 2,3-dimethyl butadiene, 2,4-hexadiene, 1,3-pentadiene and 2-methyl-1,3-pentadiene.

17. A method according to claim 9, wherein, in addition to the conjugated diolefins, further unsaturated compounds, which can be copolymerized with the specified conjugated diolefins are used in quantities of 0.1 to 80 mol % relative to the conjugated diolefin.

18. The production of rubber moldings comprising the copolymerization of conjugated diolefins with vinyl-aromatic compounds, wherein the polymerization of the conjugated diolefins with the vinyl-aromatic compounds is performed in the presence of catalysts comprising a) at least one rare-earth metal compound, b) at least one cyclopentadienyl compound and c) at least one organo-aluminum compound;

and in the presence of inert aliphatic and/or aromatic solvents or mixtures thereof at temperatures of −30 to +140° C., whereby the molar ratio of components (a):(b):(c) is in the range of 1:(0.01 to 1.99):(0.1 to 1000), component (a) of the catalyst is used in quantities of 1 μmol to 10 mmol relative to 100 g of the conjugated diolefins used, and the vinyl-aromatic compound is used in quantities of 20 g to 2000 g, relative to 100 g of the conjugated diolefins used.

19. The production of rubber moldings according to claim 18, wherein said rubber molding is a tire.

20. The production of rubber moldings comprising the copolymerization of conjugated diolefins with vinyl-aromatic compounds, wherein the polymerization of the conjugated diolefins with the vinyl-aromatic compounds is performed in the presence of catalysts comprising a) at least one rare-earth metal compound and b) at least one organo-aluminum compound and in the presence of inert aliphatic and/or aromatic solvents or mixtures thereof at temperatures of −30 to +140° C., whereby the molar ratio of components (a):(b) is in the range of 1:(0.1 to 1000), component (a) of the catalyst is used in quantities of 1 μmol to 10 mmol relative to 100 g of the conjugated diolefins used, and the vinyl-aromatic compound is used in quantities of 20 g to 2000 g, relative to 100 g of the conjugated diolefins used.

21. The production of rubber moldings according to claim 20, wherein said rubber molding is a tire.

* * * * *